No. 826,536. PATENTED JULY 24, 1906.
J. B. BUTTERFIELD.
TAP FOR STEAM, WATER, OR GAS, &c.
APPLICATION FILED JULY 14, 1905.

Witnesses:
William Sadler
Annie Park

Inventor
Joseph Booth Butterfield
by H. Fairburn Hart
Attorney.

UNITED STATES PATENT OFFICE.

JOSEPH BOOTH BUTTERFIELD, OF SCARBOROUGH, ENGLAND.

TAP FOR STEAM, WATER, OR GAS, &c.

No. 826,536.          Specification of Letters Patent.          Patented July 24, 1906.

Application filed July 14, 1905. Serial No. 269,704.

*To all whom it may concern:*

Be it known that I, JOSEPH BOOTH BUTTERFIELD, a subject of the King of Great Britain and Ireland, residing at Louieville, Weaponness Valley, Scarborough, in the county of York, England, have invented new and useful Improvements in or Relating to Taps for Steam, Water, or Gas or other Liquids or Fluids, of which the following is a specification.

This invention relates to improvements in plug-taps for steam, water, or gas or other liquids or fluids.

The object of the invention is the production of a tap of simple construction with a plug that will readily preserve a tight joint, while free from jamming should sudden or undue or unequal expansion occur and at the same time providing against any external leakage.

Figure 1:
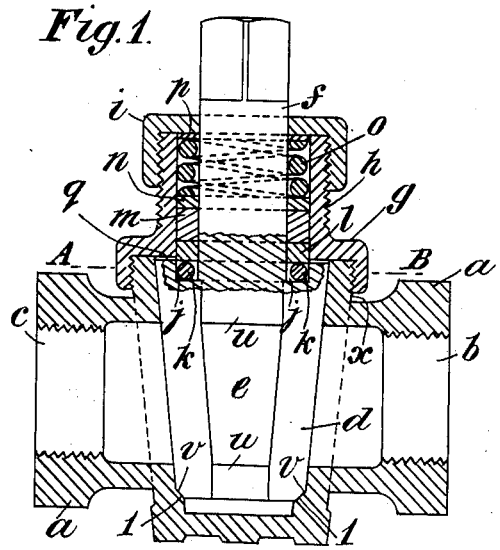
Figure 5:
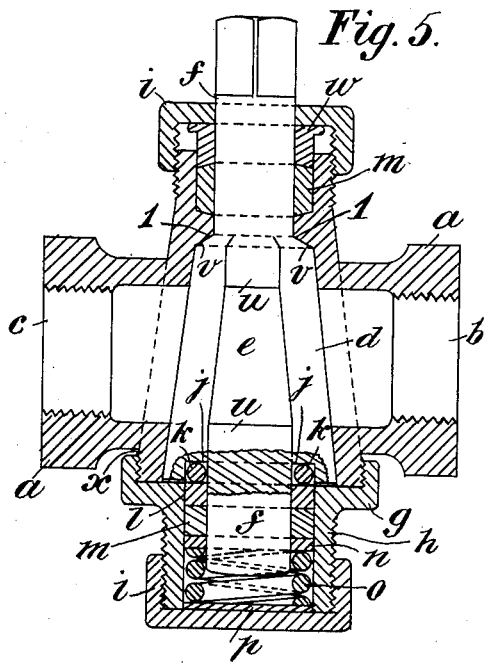
Figure 2:
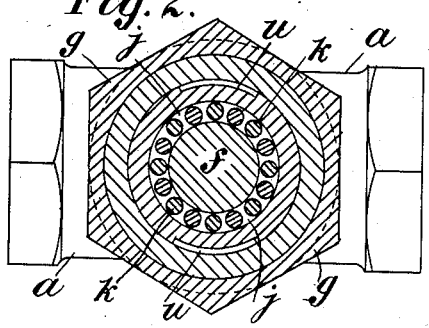
Figure 3:
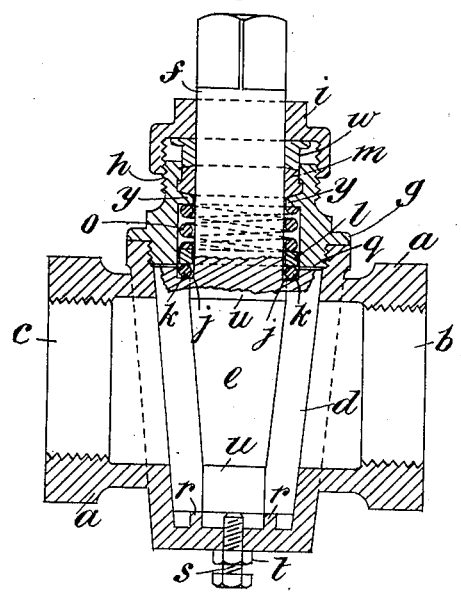
Figure 4:
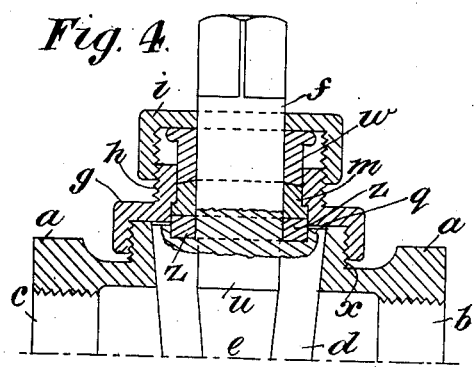

In the drawings hereunto annexed, Figure 1 is a sectional elevation of a tap constructed according to this invention; Fig. 2, a sectional plan of same on line A B, Fig. 1; Fig. 3 a part sectional elevation showing a tap in which a fixed ring or washer divides the spring from the elastic packing, with a gland to compress the elastic packing; Fig. 4, a part-sectional elevation of the upper portion of a tap in which a washer is substituted for the antifrictional bearing; Fig. 5, a sectional elevation of a tap with the spring and antifrictional bearing applied at the base of the plug.

Like parts in all the views are marked with similar characters of reference.

$a$ is the valve-casing of the tap, which is made of any suitable metal, such as brass or cast-iron, and it is provided with the usual inlet and outlet orifices $b$ and $c$, arranged, say, on opposite sides of the plug $d$. The plug $d$ (with a suitable passage $e$ formed therein) is made conical and is shown at Fig. 1 with its larger end at the top, from which rises a vertical stem $f$, secured and made, say, steam-tight by an elastic packing and a spring and cap or cover constructed as follows: To the top of the valve-casing $a$ is screwed or otherwise secured a cover $g$, provided with a projecting boss $h$, having a central hole of larger diameter than that of the vertical stem $f$ of the plug. To the said boss $h$ is screwed or otherwise attached a cap or cover $i$, having a central hole in which the vertical stem $f$ of the plug turns freely. In the top of the plug $d$ is formed a horizontal annular recess $j$, in which are placed a number of metal balls or spheres $k$ to form an antifrictional bearing, as shown at Figs. 1 and 3, or a washer $z$ may be used in place thereof, as shown at Fig. 4. Upon the balls is placed a metal washer $l$, having an elastic packing $m$ and a second metal washer $n$ above it. A helical or other coiled spring $o$ is inserted between the upper surface of the second washer $n$ and the under surface of a third metal washer $p$. On screwing down the cap $i$ the washers, spring, and elastic packing are compressed upon the metal balls, and the said packing is pressed against the periphery of the vertical stem $f$ for forming, say, a steam-tight joint. A space $q$ is provided between the top of the plug $d$ and the under surface of the first-named cover $g$.

The lower and small end of the conical plug $d$ is arranged to work upon a suitable form of seating—such as, for example, say, the lower edge of the plug $d$ may be beveled as at $v$, Fig. 1, and made to work against a correspondingly-inclined seating 1 formed within the casing at a suitable distance from the bottom of the central tapering hole in the casing, or, as at Fig. 3, a flat surface-ring $r$ may be arranged to project from the bottom of the tapering central hole in the casing. A central set-screw $s$, provided with a lock-nut $t$, is passed through the bottom of the casing and made to work against the bottom of the plug $d$, and it is employed for preventing any movement of the plug in a vertical direction. In, say, opposite points, or at more than two points of the plug $d$, are formed in its periphery vertical recesses $u$ of suitable width and depth. Two recesses $u$ are shown in the drawings. Each recess $u$ extends the full length of the conical portion of the plug or above and below the opening $e$, as shown, say, at Fig. 1, and the said recesses are employed for the purpose of allowing, say, the steam to pass freely up and down and onto the top (and, if so desired, onto the bottom as well) of the plug whenever the top is open for the purpose of preventing as far as possible any sudden or undue and unequal expansion of the plug and the casing taking place.

At Fig. 4 the upper portion of a tap and its plug is shown in which the spring $o$ is dispensed with. In this arrangement a washer $z$ is substituted for the antifrictional balls $k$ and enters the recess $j$ formed in the top of the plug $d$. The washer $z$ projects above the plug $d$, and it is compressed by the elastic or other packing, such as $m$, onto the bottom of the recess $j$ by the cover $i$ pressing the gland $w$ downward. The central hole in the cover $g$ in this case is made of two diameters. When the gland $w$ is forced downward by the cover $i$, the packing $m$ will be compressed between the gland $w$ and washer $z$, thus causing the packing to expand until it fills the larger diameter. The shoulder formed by the junction of the two diameters of the central hole aids in keeping the washer $z$ within the recess $j$ and the plug $d$ is retained upon its seating $v$.

In some cases it may be found advisable to dispense with the beveled edge $v$ of the plug $d$ and inclined seating 1 (shown at Fig. 1) and to employ the arrangement shown at Fig. 3 in place thereof—that is to say, a flat surface ring $r$ is made to project from the bottom of the tapering central hole in the casing $a$. The bottom of the plug $d$ is made to work against the upper face of the said seating. This permits of the bottom of the plug being at a suitable distance from the bottom of the said hole, whereby a cavity is formed which is in communication with the vertical recesses $u$. Also in some cases an ordinary gland $w$, as shown at Fig. 3, is employed in addition to the herein-described spring $o$. In the arrangement shown at Fig. 3, an elastic packing $m$ is inserted between the gland $w$ and an inner ring $y$, which forms part of the cover $g$ and is made to project inward. The ring $y$ separates the spring $o$ from the elastic packing $m$. The gland $w$ is pressed down upon the elastic packing $m$ by the inner surface of the cover.

When it is desired to use a plug with the larger end of same downward, as at Fig. 5, then the chamfered edge $v$ and the seating against which it works is transferred from the base to the top of the casing and the chamfered edge or shoulder $v$ fits tightly against its seating. At Fig. 5 the gland $w$ of ordinary construction is shown in place of the washer $p$. In this arrangement of plug the covers $g$ and $i$, (the latter without a central hole,) washers $l$, $n$, and $p$, boss $h$, spring $o$, elastic packing $m$, and balls $k$ may be applied to the base of the casing, as shown. The cover $g$ is screwed onto a box $x$, provided for its reception at the base of the casing $a$ instead of at its top, as at Fig. 1, or the cover $i$ may be dispensed with, in which case the cover $g$ will be provided with a solid base against which the spring $o$ will work. When this is done, the stem $f$ will be arranged to project from the smallest diameter of the plug and also from its largest diameter, as shown at Fig. 5.

Taps constructed according to this invention are thoroughly steam, water, or gas tight, and yet the spindle and plug are always free to rotate when opening and closing the valve. The above-described arrangement makes a perfectly tight valve, allowing neither steam, water, nor gas under pressure to pass or get beyond the elastic packing $m$.

Taps constructed as herein described may be readily fitted together by placing the plug $d$ within the central tapering hole of the casing $a$ with its bottom impinging upon the seating 1, Fig. 1, or $r$, Fig. 3. The antifrictional balls $k$ having been placed within the annular recess $j$ of the plug, the cover $g$ is screwed onto the top of the casing, and the washer $l$ is then placed upon stem $f$ until its under surface rests upon the antifrictional balls. Afterward the elastic packing $m$, the second washer $n$, helical spring $o$, and the third washer $p$ are placed upon the stem $f$ and within the central hole of boss $h$. When this has been done, the cap $i$ is screwed onto the boss $h$ and in so doing compresses the just-named spring arranged around the stem $f$ for retaining the plug $d$ upon its seating and also forming a tight joint. At the same time the plug $d$ is free to be rotated. When the plug is turned so that its horizontal passage $e$ completes the communication between inlet $b$ and outlet $c$, the steam or other fluid is free to pass down and up the vertical recesses $u$ under the plug $d$ and also onto its top for keeping the casing at an even temperature, and thereby preventing jamming should any sudden or undue or unequal expansion occur.

The same results are obtained by the arrangement shown at Fig. 3, where the central hole of the boss $h$ is made of varying diameters and with a fixed internal ring $y$. This necessitates the parts being put together as follows: The washer $l$ and spring $o$ having been placed within the lower portion of the said central hole of the plug $h$ and the stem $f$ threaded through it, the cover $g$ is then screwed onto the top of the casing $a$, which by the compression of the spring $o$ presses and retains the plug $d$ tightly against its seat. The elastic packing $m$ and gland $w$ are then placed in the portion of the central hole of the boss $h$ above the ring $y$ and around the spindle $f$. On the cap $i$ being screwed onto the boss $h$ the gland will be depressed, which causes the elastic packing $m$ to enter the larger diameter of the central hole in the boss and at the same time to be pressed against the stem $f$ for forming a tight joint.

What I claim as my invention, and desire to secure by Letters Patent, is—

The combination in a tap of a casing having inlet and outlet orifices, and provided with a central tapering hole with which said orifices communicate, such casing also having a seating above the bottom of the tapering hole, a cap adapted to be screwed onto the top of said casing, said cap having a central recess, a cover with a central hole adapted to be secured upon said cap, a tapering plug having a horizontal passage therein, vertical recesses in its periphery, and an annular groove in its top, a stem for operating purposes projecting from its top and arranged to pass through and above the said cap and its cover, and means described for keeping the plug down upon its seating, comprising a number of antifrictional balls arranged in said annular groove, washers mounted upon the said stem, one of which rests upon said antifrictional balls, with an elastic packing between them, and a spring interposed between the top of the upper washer and the cover of the said cap, as and for the purposes set forth.

In testimony whereof I have signed my name to this specification in the presence of two subscribing witnesses.

JOSEPH BOOTH BUTTERFIELD.

Witnesses:
WILLIAM SADLER,
ANNIE PARK.